United States Patent
Gassmann et al.

[15] 3,699,804
[45] Oct. 24, 1972

[54] CAPILLARY VISCOMETER

[72] Inventors: Hans Ulrich Gassmann, Fribourg; Michel Mugnier, Monthey, both of Switzerland

[73] Assignee: Ciba-Geigy AG, Basle, Switzerland

[22] Filed: Jan. 20, 1971

[21] Appl. No.: 107,942

[30] Foreign Application Priority Data

Jan. 22, 1970    Switzerland................894/70

[52] U.S. Cl. .................................................. 73/55
[51] Int. Cl. .............................................. G01n 11/06
[58] Field of Search ........................................ 73/55

[56] References Cited

UNITED STATES PATENTS

| | | | |
|---|---|---|---|
| 2,048,305 | 7/1936 | Ubbelohde | 73/55 |
| 2,674,118 | 4/1954 | Westmoreland | 73/55 X |
| 3,277,694 | 10/1966 | Cannon et al. | 73/55 |
| 3,283,565 | 11/1966 | Muller et al. | 73/55 |
| 3,286,511 | 11/1966 | Harkness | 73/55 |

Primary Examiner—Louis R. Prince
Assistant Examiner—Joseph W. Roskos
Attorney—Wenderoth, Lind & Ponack

[57] ABSTRACT

A capillary viscometer has a capillary in one arm of a U-tube. The other arm contains a pair of coaxial but axially spaced measuring electrodes the upper one of which is axially adjustable. A reference electrode is mounted in the base of the U-tube and an axially adjustable control electrode is disposed beyond the upper end of the capillary. A measured quantity of a test liquid is introduced into the measuring electrode arm and drawn up into the capillary arm by vacuum applied at the upper end of the capillary until the liquid contacts the control electrode. Upon the liquid now being allowed to flow back up the measuring electrode arm, the flow path including the capillary, contact of the leading liquid meniscus with the lower and upper measuring electrode respectively starts and stops a clock. The time measured is a function of viscosity. The adjustable measuring electrode allows the viscometer to be calibrated to a known standard. There is described a pneumatic system whereby the operations in measurement are performed and an electric control circuit which enables measurements to be made substantially automatically.

15 Claims, 3 Drawing Figures

INVENTORS
HANS ULRICH GASSMANN
MICHAEL MUGNIER

CAPILLARY VISCOMETER

This invention relates to a capillary viscometer.

It has previously been proposed to provide a capillary viscometer comprising a U-shaped tube having a pair of electrodes between which a test liquid flows, the pair of electrodes defining a measuring distance over which the time for the liquid to flow is a function of the viscosity of the liquid, the flow path of the liquid including a capillary. A further electrode is in contact with the liquid, and the passage of the liquid past the measuring electrodes is used to generate starting and stopping signals for a timing clock.

More specifically in one form of viscometer of the kind outlined above, each measuring electrode consists of a pair of electrodes between which the liquid passes. The passage of the trailing meniscus of the flowing liquid through the gap between the upper pair of electrodes and the resultant interruption of the circuit between the liquid and the upper electrodes causes a timing clock to be started, whereas the passage of the meniscus between the lower pair of electrodes causes the timing clock to be stopped. In such an arrangement the instant the liquid passes the measuring electrodes cannot be precisely determined because detached droplets from the liquid as the trailing liquid meniscus passes the electrodes has the effect of indicating too long a time of flow.

Another drawback which is incidentally common to all known types of capillary viscometers is that the calibration curves of different viscometers are never alike. In practice this is a most inconvenient defect because it means that measurements made with different viscometers cannot be easily compared. Although the flow resistances are approximately equal when standardized measuring capillaries are employed, calibration and capacity errors that have a considerable effect on the accuracy of the result still occur because an exact calibration of the part of the viscometer between the measuring capillary and the upper measuring electrode is practically impossible to accomplish. Since in conventional viscometers, the electrodes extend perpendicularly through the tube wall into which they are fused, any existing calibration and capacity errors can at least not be subsequently corrected by adjusting the distance between the two measuring electrodes. An exact adjustment of the position of the electrodes is difficult enough during the manufacturing process and completely impossible later. Consequently it was hitherto impossible to produce capillary viscometers having identical calibration curves.

There will be hereinafter described a capillary viscometer embodying the present invention which at least substantially mitigates the disadvantages of prior viscometers described above.

In its broadest aspect, the present invention provides a capillary viscometer comprising a generally U-shaped tube, a capillary extending along a portion of one arm of said tube; a pair of electrodes mounted in axially spaced relation in the other arm of said tube to define a measuring distance therebetween; a third electrode mounted in said tube between the lower end of said capillary and the lower electrode of said pair; and a fourth electrode mounted in said one arm of said tube above of the upper end of said capillary; an inlet for a test liquid in said other arm, said inlet being at a point above the measuring distance defined between said first pair of electrodes, and a port for communicating with said one arm, said port being disposed at a point above the point of nearest approach of said fourth electrode to the upper end of said capillary; and means on which the upper electrode of said pair is mounted, said mounting means being adjustable to control the axial position of said upper electrode of said pair in said other arm whereby said measuring distance can be adjusted.

A viscometer with at least one adjustable measuring electrode as proposed by the present invention permits the above-mentioned calibration and capacity errors to be fully compensated. The proposed control electrode permits the viscometer to be used in a viscosity measuring process which is substantially automated. Another advantage of the proposed form of construction is that the geometry of the arrangement can be so contrived that the electrical signals at the measuring electrodes are generated by the leading meniscus of the liquid during the actual measured passage of the liquid through the capillary. By means of such an arrangement it is possible to obtain an exactly defined time of passage that is always precisely reproducible.

In order that the invention and the manner of putting it into practice may be better understood, an embodiment of the invention will now be described, by way of example, with reference to the drawings in which.

Figure 1:
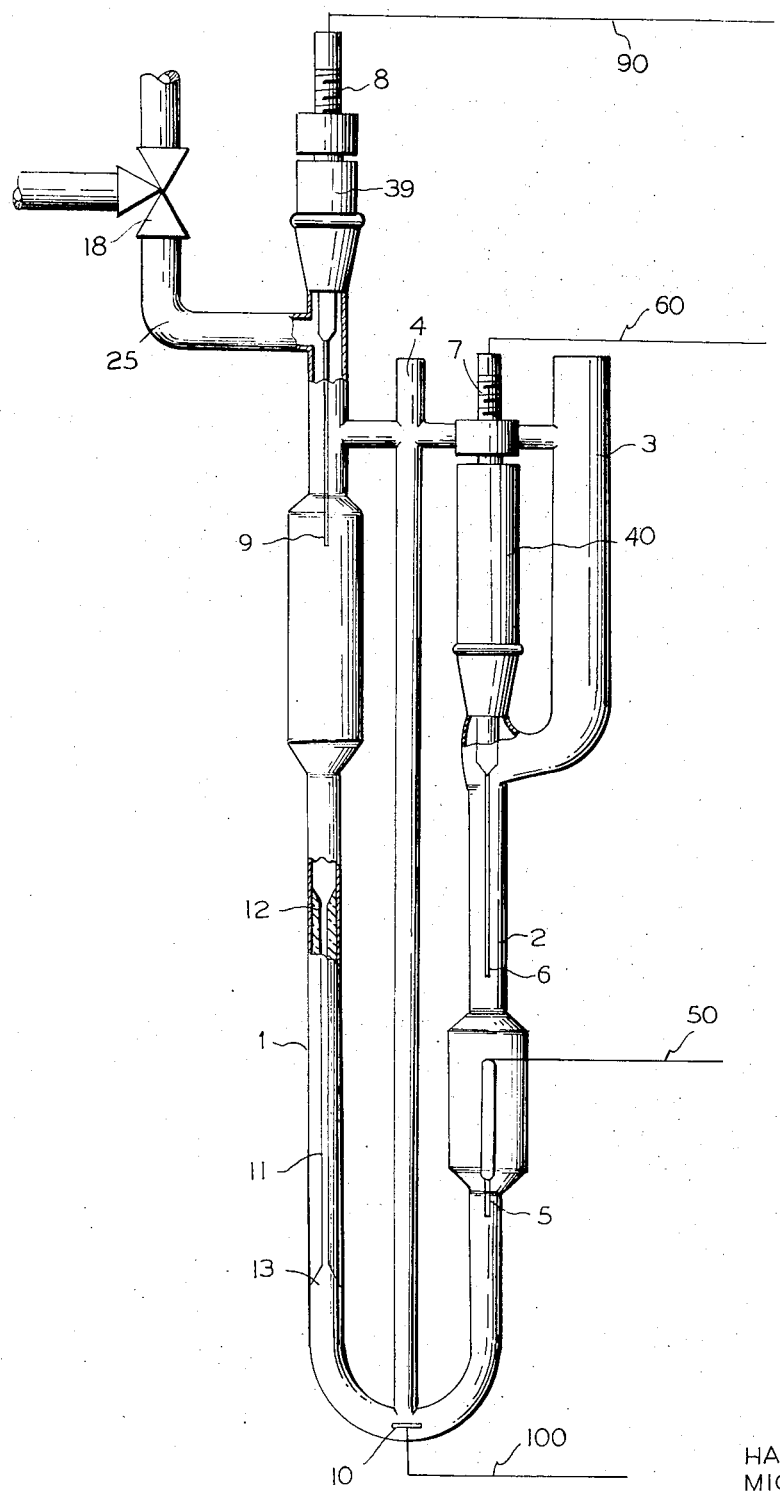
FIG. 1 is somewhat diagrammatic showing of a view of a capillary viscometer of the invention.

With reference first to FIG. 1 there will be seen a capillary viscometer comprising a generally U-shaped tube having two arms or shanks 1 and 2 and a means for receiving a test liquid in the form of a stub pipe 3 at the upper end of arm 2 for filling the tube with a test liquid whose viscosity is to be measured. The entire arrangement is mounted on a support 4. The first arm 2 contains two coaxially disposed measuring electrodes 5 and 6. Electrode 5 is fixedly fused into the wall of the tube from which a connecting lead 50 extends. Electrode 6 is held in position at an adjustable level by screw 7 having a micrometer thread engaging in a fitting 40. The fitting 40 is disposed at the upper end of arm 2 so that the electrode 6 depending downwardly from screw member 7 is adjustable axially along the arm. The stub pipe 3 enters arm 2 at an inlet point intermediate the top of the arm 2 on which fitting 40 is mounted and the lower tip (lower end) of electrode 6. Electrodes 5 and 6 are both elongate, extending coaxially along arm 2 and defining a measuring distance between their free lower ends. A control electrode 9 is held at an adjustably variable level at the upper end of the tube arm 1 of the tube by a screw member 8 having a micrometer thread engaging in a fitting 39 mounted on the upper end of the arm 1. The electrode 9 is also elongate, depending downwardly along the axis of arm 1 but having its free lower end above a capillary 11 described below. The U-shaped connection between the two arms 1 and 2 contains a reference electrode 10 which is fused into the wall of the tube, between the lower end of capillary 11 and the lower measuring electrode 5. Electrode 10 serves as a common reference for the measuring electrodes as well as for the control electrode as will be subsequently described with reference to FIG. 3.

The capillary 11 provided inside a portion of the arm 1 to extend therealong is formed with a ground flared or funnel-shaped entry and exit at its upper and lower ends 12 and 13 respectively. These frusto-conical funnels precisely define the length of the measuring capillary as well as the shapes of the transitions of the capillary into the body of the arm 1. Consequently the conditions of flow, and more particularly the drag, are always the same at these points of transition. At a level between the fitting 39 and the free lower end of the control electrode 9 a connecting pipe 25 communicates with a port in the arm 1. The pipe 25 and the pneumatic connections to it are described more particularly below with reference to FIG. 2.

The grinding of the entry and exit funnels 12 and 13 at the ends of the measuring capillary 11 is of special importance because in the case of non-Newtonian fluids, i.e. fluids whose apparent viscosity or consistency is a function of the shear stress, the result of the measurement is affected by the shape of the measuring capillary. Not only the width and length of the capillary but also the shape of the transitional zones between the capillary and the viscometer tube are relevant factors. In the conventional manufacture of glass viscometers these transitions are simply formed by fusing the capillary at each end to a further glass tube, a procedure which precludes the creation of a precise and well-defined geometry of the transition. In the now proposed viscometer it is preferred that the funnels have an aperture angle in the range of 15° to 60°.

Figure 2:
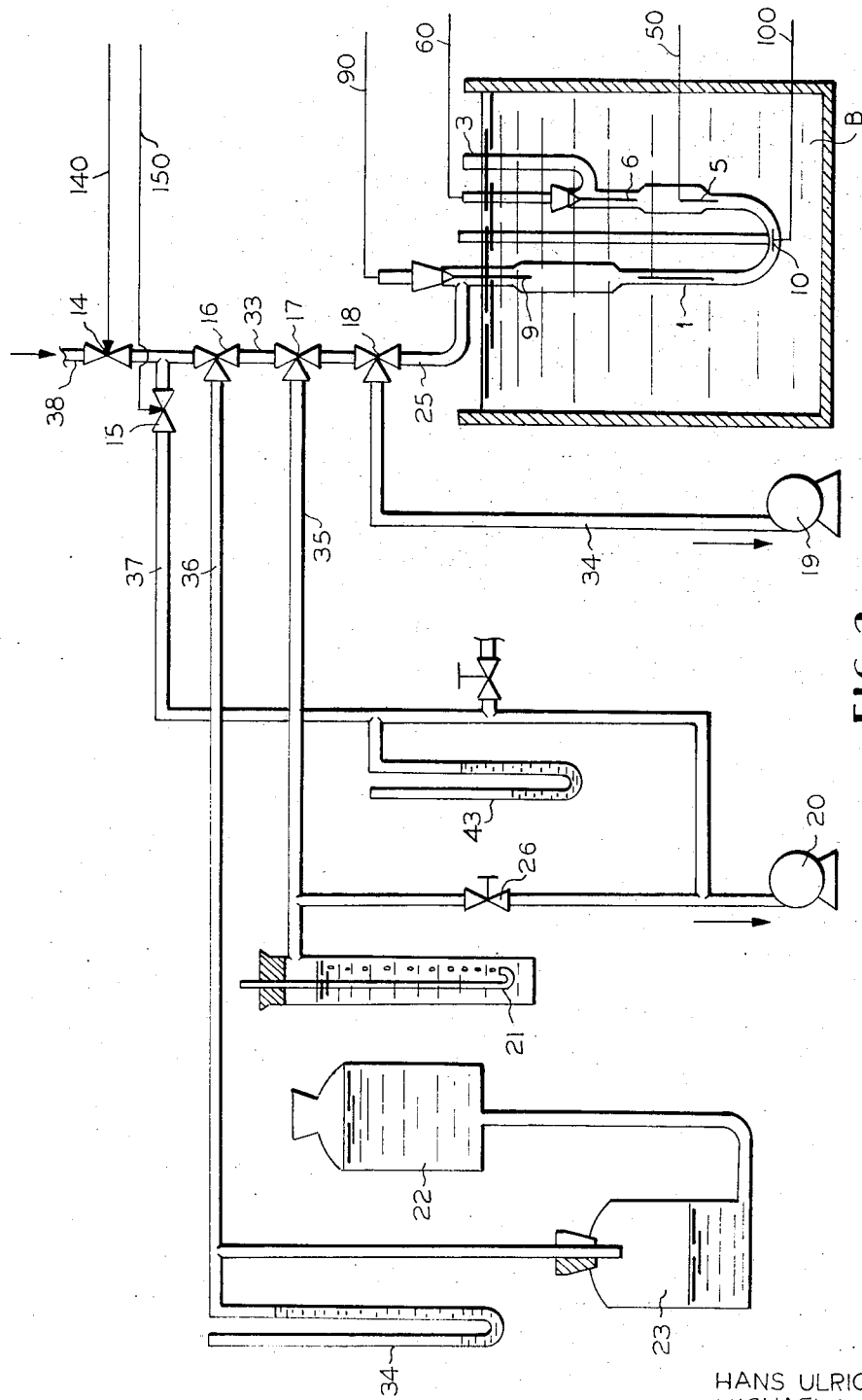
FIG. 2 is a schematic representation of a pneumatic system associated with the capillary viscometer for making measurements.

Referring to FIG. 2, it is seen that the entire viscometer is immersed in a thermostatically controlled bath B. The pipe connection 25 is joined to a five-ported manifold 33 from three ports of which extend branch pipes 34, 35 and 36 controlled by three-way cocks 16, 17 and 18 respectively. In addition further pipes 37 and 38 are connected to the two other ports of manifold 33 controlled by electromagnetic valves 15 and 14 respectively. Pipe 34 is a flushing pipe; pipes 35 and 37 lead to vacuum; pipe 36 is a pressure pipe and pipe 38 provides a venting. The flushing pipe 34 leads to a water jet pump 19. a vacuum source joined to pipe 35 comprises a suction pump 20, a water column 21 and a manometer tube 43 which indicates the adjustable vacuum pressure. The magnitude of this vacuum pressure is determined by the length of the water column 21. The pressure source associated with pipe 36 comprises two vessels 22 and 23 mounted at different levels and having a communicating pipe therebetween, and a manometer 34 which gives a reading of the adjustable gauge pressure. This pressure is determined by the difference in level between the liquids contained in the two vessels 22 and 23. The second vacuum pipe is likewise connected to the suction pump 20. When a valve 26 between the pump 20 and water column 21 is closed the full suction head of the pump 20 can be applied to the arm 1 of the viscometer through pipe 37.

In FIGS. 1 and 2, the electrodes 5, 6, 9 and 10 are shown as connected to lines 50, 60, 90 and 100 respectively and in FIG. 2, the valves 14 and 15 are shown as being controlled through lines 140 and 150 respectively. These lines form part of a measuring control circuit set out in FIG. 3.

Figure 3:
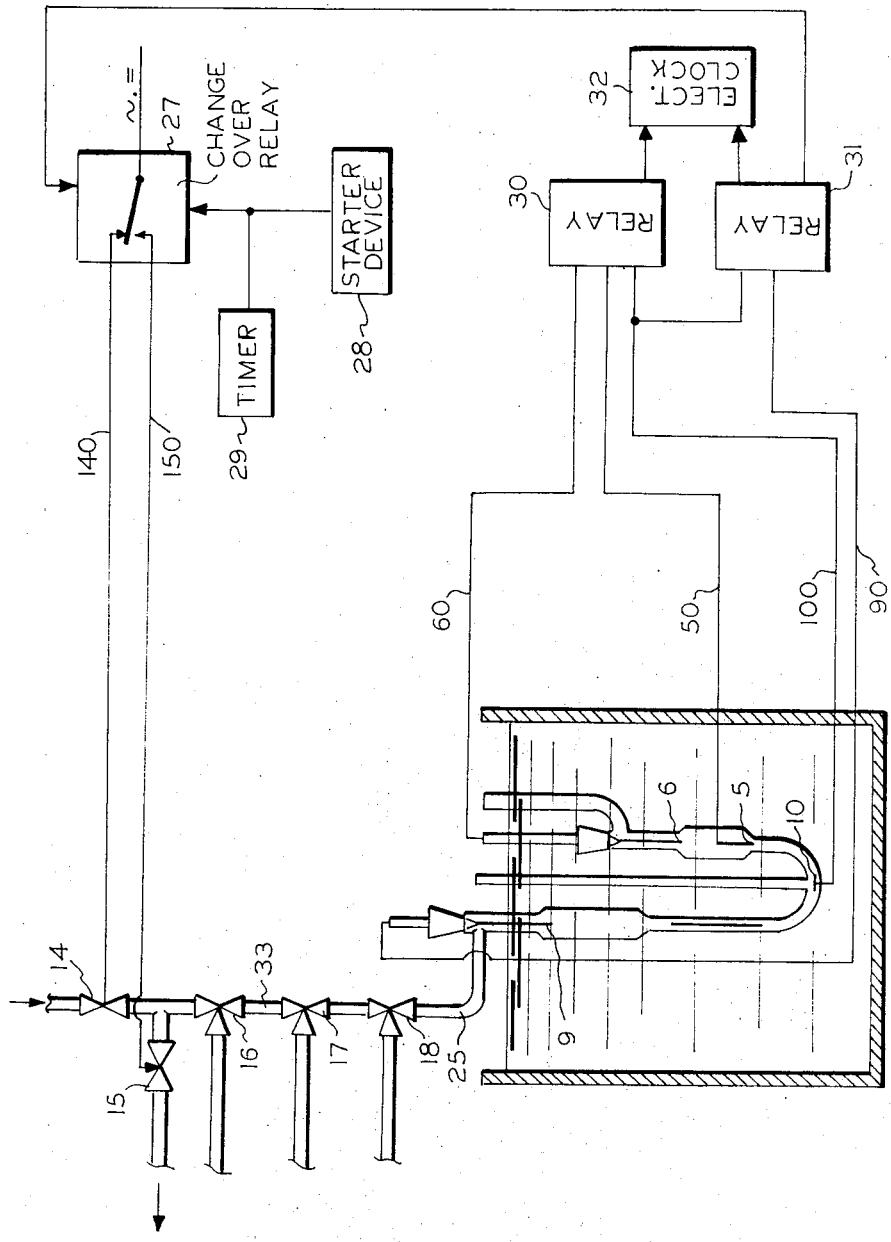
FIG. 3 is a block diagram of an electronic control and regulating system associated with the capillary viscometer for making measurements.

As shown in FIG. 3 the two valves 14 and 15 are connected via lines 140 and 150 to a change-over relay 27 which selectably opens the one and closes the other of the two valves. The relay 27 is operated by a starter device 28 or, if the measurement is to be periodically repeated, by a timer 29. The two measuring electrodes 5 and 6 and the reference electrode 10 are connected by the lines 50, 60 and 100 to a relay 30 which starts and stops an electric clock 32 in response to successive activation of lines 50 and 60. The control electrode 9 as well as the reference electrode 10 are connected by the lines 90 and 100 to a relay 31 which after each measurement zeros the clock 32 and at the same time operates the relay 27.

The manner in which the arrangement illustrated in FIGS. 1 to 3 functions will now be described. Initially valve 14 is open and valve 15 closed. A predetermined volume, say 20 ml., of the liquid that is to be tested is introduced into the filler tube 3 with the aid of a pipette. The starter 28 is then operated, operating change-over relay 27 and causing valve 14 to close and valve 15 to open. The vacuum created by pump 20 draws the liquid up the interior of the arm 1 until its upper meniscus touches the control electrode 9. An electrical signal which now appears in the circuit 9 – 90 – 31 – 100 – 10 operates the relay 31 and through the latter the relay 27 restoring this relay and causing the valve 15 to close and the valve 14 to open. At the same time the same signal causes the relay 31 to zero the clock 32. Before making the measurement the control electrode 9 is adjusted by the micrometer screw 8 so that the upper meniscus of the liquid will just touch the point of the electrode before the lower meniscus of the liquid reaches the reference electrode 10. This is the induction part of the measuring cycle. The measurement proper is initiated by the opening of valve 14 venting the arm 1. The liquid now rises in the arm 2. Upon reaching the electrode 5 a signal appears in the circuit 5 – 50 – 30 – 100 – 10. The activation of relay 30 through line 50 starts the clock 32. Upon reaching the second electrode 6 a signal is generated in the circuit 6 – 60 – 30 – 100 – 10. The activation of relay 30 through line 60 stops the clock 32. The time measured by clock 32 is function of the viscosity of the test liquid.

The measurement can be repeated any number of times by operating the starting device 28. However, for the purposes of a periodical repetition of the measurement, as required for monitoring changes in viscosity over prolonged periods of time, use is made of the timer 29. In such repetitive measurements the viscometer will usually be connected to a recording instrument. The vacuum pressure used for drawing in the liquid is kept constant and monitored by the manometer 43. This is necessary because, on the one hand, in the case of thixotropic liquids, the result of the measurement is significantly affected by the shear stress during the induction part of the measuring cycle and, on the other hand, because the capacity error due to some of the liquid adhering to the walls and trickling back down the wall of the measuring chamber between the measuring electrodes 5 and 6 can be kept constant only if the induction times remain the same.

When measuring thixotropic liquids, the latter must be retained for a certain length of time in the upper part of the arm before the measurement is actually performed. For this purpose use is made of the adjustable vacuum that can be applied to the arm 1 by opening the cock 17.

The adjustable pressure that can be applied through the cock 16 to be interior of the arm 1 permits measurements to be performed under varying shear stress, i.e., for recording rheograms in the same way as with a rotary viscometer.

In a preferred viscosity measuring apparatus, a plurality and preferably three capillary viscometers are immersed in the thermostatic bath B, each viscometer being selectably connectable by changeover switch means to the pneumatic system (FIG. 2) and to the electronic control system (FIG. 3). This has the major advantage that one capillary tube can be flushed and a second filled with a liquid that is to be tested while a measurement is being performed in a third.

What is claimed is:

1. A capillary viscometer comprising a generally U-shaped tube, a capillary extending along a portion of one arm of said tube; a pair of electrodes mounted in axially spaced relation in the other arm of said tube to define a measuring distance therebetween; a third electrode mounted in said tube between the lower end of said capillary and the lower electrode of said pair; and a fourth electrode mounted in said one arm of said tube above the upper end of said capillary; an inlet for a test liquid in said other arm, said inlet being at a point above the measuring distance defined between said first pair of electrodes, and a port for communicating with said one arm, said port being disposed at a point above the point of nearest approach of said fourth electrode to the upper end of said capillary; and means on which the upper electrode of said pair is mounted, said mounting means being adjustable to control the axial position of said upper electrode of said pair in said other arm whereby said measuring distance is adjusted.

2. A capillary viscometer as claimed in claim 1 wherein said pair of electrodes are coaxially mounted in said other arm and said mounting means is disposed at the upper end of said other arm, said upper electrode of said pair depending downwardly from said mounting means.

3. A capillary viscometer as claimed in claim 2 wherein each of said pair of electrodes is elongate, extends along said other tube arm and has a free lower end, said measuring distance being defined between said free lower ends of said pair of electrodes.

4. A capillary viscometer as claimed in claim 1 further comprising means on which said fourth electrode is mounted, said fourth electrode mounting means being adjustable to control the axial position of said fourth electrode in said one tube arm.

5. A capillary viscometer as claimed in claim 4 wherein said fourth electrode mounting means is mounted at the upper end of said one tube arm and said fourth electrode depends downwardly therefrom.

6. A capillary viscometer as claimed in claim 5 wherein said fourth electrode is elongate and extends along said arm and has a free lower end.

7. A capillary viscometer as claimed in claim 1, further comprising a means for receiving a test liquid leading from said inlet in said other tube arm.

8. A capillary viscometer as claimed in claim 1, further comprising a manifold connected to said port in said one tube arm.

9. A capillary viscometer as claimed in claim 8 wherein said manifold has five ports each controlled by respective valve to control communication from the port to said one tube arm.

10. A capillary viscometer as claimed in claim 9 further comprising means for flushing said tube of a test liquid connected to a first of said five manifold ports, a source of pressure connected to a second port, a vent connected to a third port and a source of vacuum connected to each of the fourth and fifth of said manifold ports.

11. A capillary viscometer as claimed in claim 10 wherein the valves of said third and fourth ports are electrically operable.

12. A capillary viscometer as claimed in claim 11 further comprising control means connected to the valves of said third and fourth ports and operable to selectively open one and close the other of said third and fourth ports, said control means being connected to said fourth electrode to be operated in dependence upon electrical signals generated thereat.

13. A capillary viscometer as claimed in claim 9 wherein each transition section has an aperture angle in the range of 15° to 60°.

14. A capillary viscometer as claimed in claim 1 comprising a respective flared transition section extending from each end of said capillary to the adjacent portion of said one arm of the tube.

15. A capillary viscometer comprising a U-shaped measuring tube; two measuring electrodes located in coaxial alignment inside one shank of the measuring tube to define a measuring distance for the flow of a test liquid therebetween; a control electrode in the other shank of the measuring tube; a common reference electrode located in the measuring tube between the control electrode and the lower measuring electrode; the two ends of the measuring tube having respective fittings received thereat in centralized register and on which fittings the upper measuring electrode and the control electrode are respectively mounted so as to be disposed coaxially inside the respective shank of the tube, said fittings being adjustable to control the axial positions of said upper measuring electrode and control electrode respectively; an inlet pipe connected to the one shank at a level intermediate the fitting thereat and the free end of the upper measuring electrode; and a branch pipe leading to a manifold, said branch pipe being connected to said other shank intermediate the fitting thereat and the free end of said control electrode.

* * * * *